No. 833,594. PATENTED OCT. 16, 1906.
O. FROMAN & J. C. CAVE.
REPLANTER ATTACHMENT FOR CULTIVATORS.
APPLICATION FILED FEB. 10, 1906.

2 SHEETS—SHEET 1.

WITNESSES:
Samuel E. Wade
Geo. S. Brock

INVENTORS
Oscar Froman
John C. Cave
BY Munn & Co.
ATTORNEYS

No. 833,594. PATENTED OCT. 16, 1906.
O. FROMAN & J. C. CAVE.
REPLANTER ATTACHMENT FOR CULTIVATORS.
APPLICATION FILED FEB. 10, 1906.
2 SHEETS—SHEET 2.
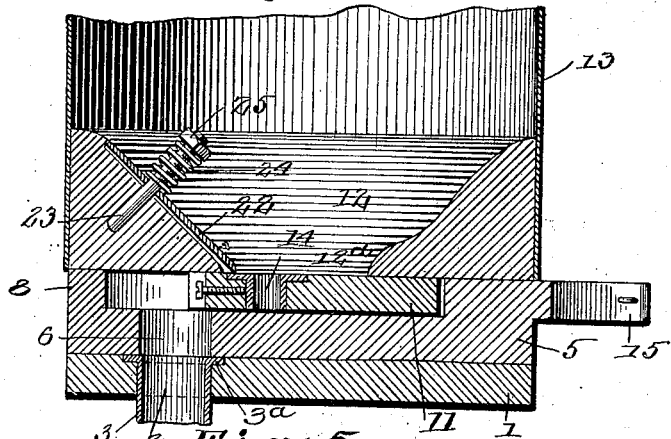
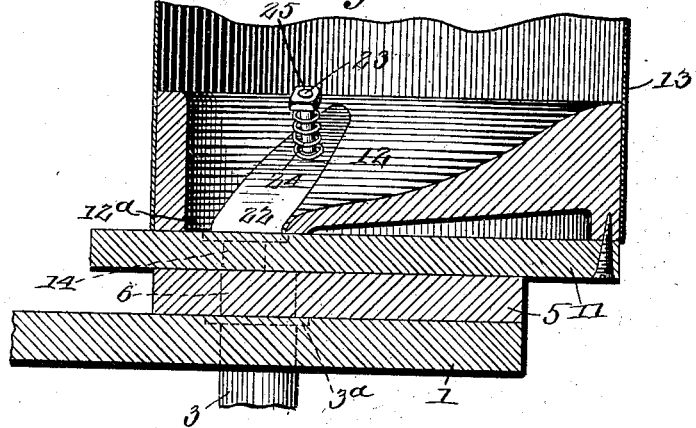
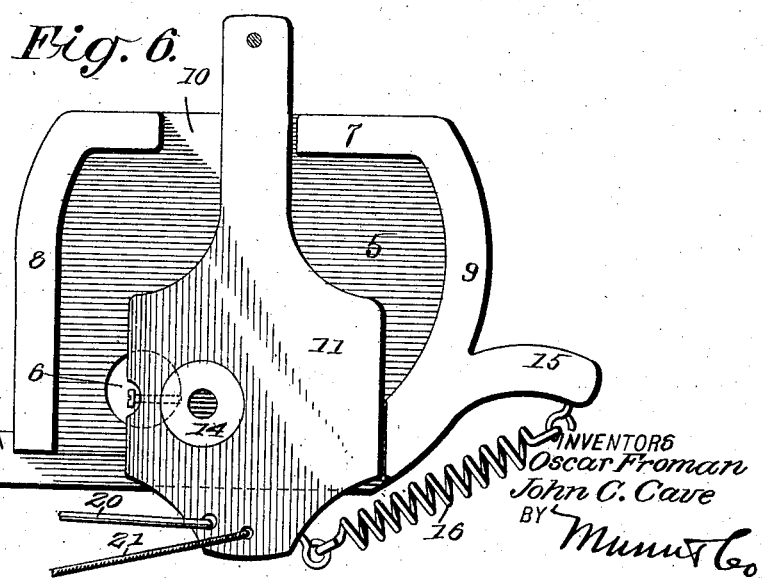

UNITED STATES PATENT OFFICE.

OSCAR FROMAN AND JOHN C. CAVE, OF EDNA, KANSAS.

REPLANTER ATTACHMENT FOR CULTIVATORS.

No. 833,594.  Specification of Letters Patent.  Patented Oct. 16, 1906.

Application filed February 10, 1906. Serial No. 300,450.

*To all whom it may concern:*

Be it known that we, OSCAR FROMAN and JOHN C. CAVE, citizens of the United States, residing at Edna, in the county of Labette and State of Kansas, have invented a new and useful Improvement in Replanter Attachments for Cultivators, of which the following is a specification.

Our invention relates to improvements in replanting attachments for cultivators, and has for its object to provide a simple replanting attachment readily applied to any cultivator and operated by the operator either by hand or foot and to so construct the device that a person operating the cultivator may at any time instantly and accurately drop a set or hill of corn or other grain in a lost hill and to add to one thinly planted and cover the same while the field is being cultivated.

With these and other objects in view our invention consists in certain novel features of construction, arrangement, and combination of parts, as will be hereinafter fully described, and pointed out in the claims, reference being had to the accompanying drawings, in which—

Figure 1:
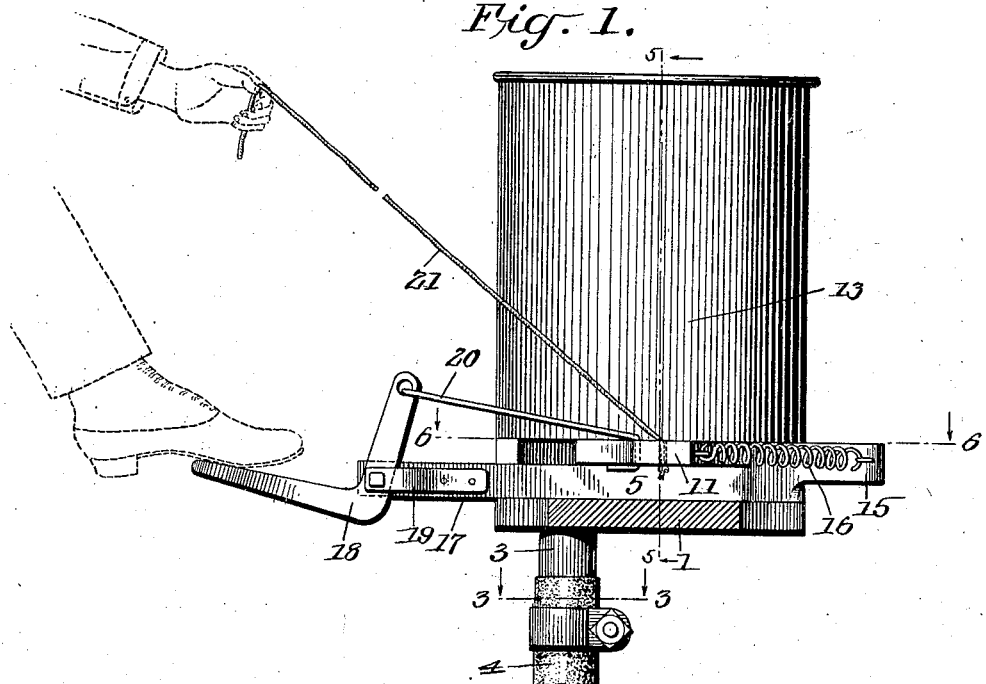
Figure 3:
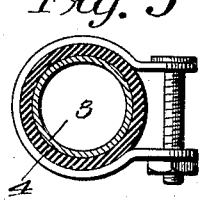
Figure 2:
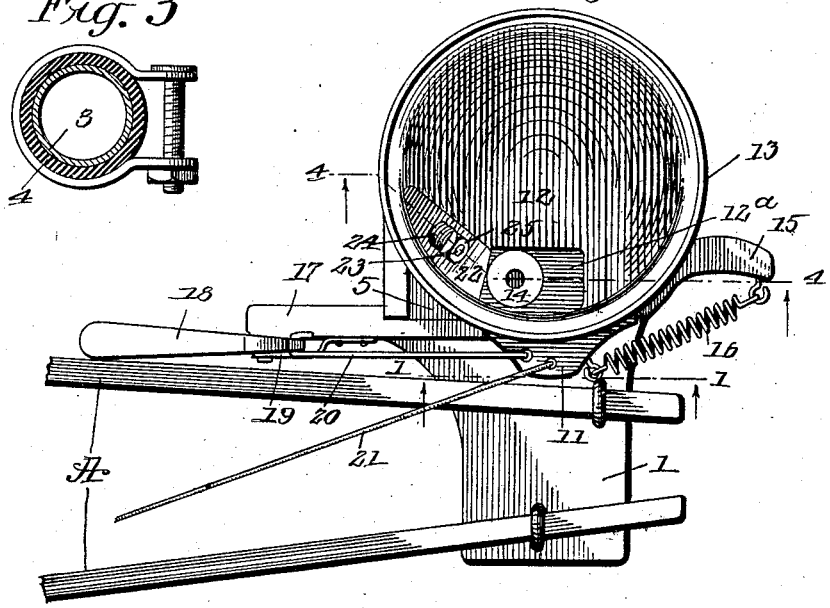

Figure 1 is a side elevation of our improvement as in operation. Fig. 2 is a top plan view of the same. Fig. 3 is a sectional view of the dropping or conducting tube and clamp for holding the rubber tube to the drop-tube. Fig. 4 is a vertical section of the seedbox or hopper, taken on line 4 4 of Fig. 2. Fig. 5 is a similar section taken on line 5 5 of Fig. 1, and Fig. 6 is a horizontal section taken on line 6 6 of Fig. 1.

In carrying out our invention we take a cross-head 1, one end of which is reduced and secured to the beams A of a cultivator. The other end of the cross-head is enlarged and approximately circular and projects inwardly between the two sets of beams forming a cultivator-frame and hangs over the center of the space between the said two sets of beams for dropping seed between the two front shovels of each set, said seed being covered by said shovels. The cross-head 1 has an opening 2 through it, said opening being arranged eccentrically and having extending downwardly from said opening a drop-tube 3, having adjustably clamped to it a rubber conducting-tube 4, as shown in Fig. 1.

5 designates the base-plate of the seed-dropping mechanism, said plate being secured to the cross-head 1 and being provided with an opening 6, coinciding with the eccentrically-disposed opening 2 in cross-head 1. The base-plate is provided with the vertical flanges 7, 8, and 9, extending round three of its sides, the flange 7 having the opening 10, through which projects one end of the drop-plate 11, said drop-plate being pivoted at one end to the bottom of hopper-shaped floor 12 of the seedbox 13. The drop-plate has an enlarged central portion provided with a vertical opening eccentrically disposed, said opening having therein the flanged bushing 14.

15 is an arm projecting from the base-plate 5 and has secured to it one end of a coiled spring 16, the other end of which is secured to the drop-plate 11.

17 is an arm extending rearwardly from the base-plate 5 and has pivoted to it the foot-lever 18 by means of a strap and a pin 19.

20 is a rod or cable secured at one end to one end of foot-lever 18, while the opposite end of said rod or cable is secured to outer end of the drop plate or slide 11.

21 is a cord fastened at one end to the outer end of drop or slide plate 11, said cord to be used when a walking or hand cultivator is used and the foot-lever to be used when the device is attached to a riding-cultivator.

The drop-tube 3 is flanged at its upper end, as at 3ª, said flange fitting in a seat in the upper face of cross-head 1, thus fitting snugly between said cross-head and the base-plate 5.

The hopper-floor 12 slopes downwardly in the shape of an inverted cone to one side, where it has an opening 12ª to expose the drop or slide plate opening 14 beneath it.

22 is a cut-off plate secured to the sloping floor of the hopper 12 by a bolt 23, projecting diagonally upward from said hopper.

24 is a coiled spring surrounding the bolt 23 between the cut-off plate and the nut 25. The free end of the cut-off plate bears against the upper surface of drop or slide plate 11. By means of the nut and spring the pressure of cut-off plate against the drop-plate can be regulated.

The parts are shown in their normal position in Fig. 2. If now the seedbox is filled with the seed it is desired to plant, said seed will flow toward the opening 12ª in the floor 12 and a predetermined quantity of seed drop into the opening 14 of drop-slide 11, the lower end of which is closed by the upper surface of the base-plate 5. When the operator wishes to drop the seed, he pulls the drop-slide to the left by means of the foot-bar 18 and rod 20 or by the cord 21, as the case may be. When this is done, the seed that are in the opening 14 will be carried over to opening 6 and drop through the same into drop-tube 3 and thence through rubber tube 4 to the ground. At the same time the cut-off plate will prevent too many seed entering the opening 14 and prevent clogging up of the same, as is evident.

It will be noted that our replanter can be applied to any cultivator and that it can be adjusted on the beam thereof so that the seed may fall in front of the shovel or at any other point. Different size bushings 14 in the drop-slide may also be used, so that various kinds of seeds, corn, cane, broom-corn, Kafir corn, beans, &c., may be planted, said bushings being held in place by a set-screw, as shown in Figs. 4 and 6 of the drawings.

By the use of the adjustable rubber tube 4 the lower end can be placed near the ground to prevent scattering by the wind.

By our replanter the planting is entirely under the control of the operator, so that he can plant when and where he wishes to and be sure that the grain is covered by the shovels. He may also plant so that the grain will be covered very shallow, whereby it will come up quickly and grow up with the first planting.

Having thus described our invention, what we claim as new, and desire to secure by Letters Patent, is—

1. In a replanting attachment for cultivators, the combination with a seed-holder having a sloping perforated bottom, a drop-slide pivoted beneath said bottom provided with an opening therethrough, and a flat cut-off plate yieldingly supported on said sloping bottom and adapted to bear at one end against the upper face of the drop-slide adjacent to the opening therethrough.

2. In a replanting attachment for cultivators, the combination with a seed-holder having a sloping bottom having an opening arranged eccentrically therethrough, a flanged base-plate below said seed-holder and having an eccentrically-located opening therethrough, a drop slide or plate pivoted at one end to the seed-holder, and seated on the base-plate between the flanges thereof, said drop-slide having an opening therethrough near its free end, a spring secured at one end to base-plate and at the opposite end to the free end of the drop-slide, a cut-off plate secured to floor of the seed-receptacle and projecting through the opening therein to bear against the upper face of the drop-slide, and means for actuating the drop-slide to bring the openings in said drop-plate and the base-plate into register.

3. In a replanting attachment for cultivators, the combination with a cross-head and means for detachably securing the same to a cultivator-beam, said cross-head having an opening therethrough arranged eccentrically, a base-plate mounted on said cross-head having vertical flanges at its edges, said base-plate having an eccentrically-disposed opening coinciding with the opening in the cross-head, a seed-receptacle secured to said base-plate, said seed-receptacle having a sloping floor and an opening therethrough, a drop slide or plate pivoted at one end to the seed-receptacle, and extending between the flanges of the base-plate, said drop-slide having an opening therethrough, a cut-off plate adjustably secured to the floor of the seed-receptacle and projecting through the opening thereof against the upper face of the drop-slide, a spring secured at one end to the free end of the drop-slide and at its opposite end to the base-plate, and means for actuating the drop-slide to bring the opening thereof into registry with openings through the base-plate and cross-head.

4. In a replanting attachment for cultivators, the combination with a seed-receptacle having a sloping floor and an opening therethrough, eccentrically disposed, a base-plate to which said receptacle is secured, said base-plate having an opening therethrough eccentrically disposed, said base-plate also having vertical flanges at its edges separating it from the base of the seed-receptacle, a drop-slide pivoted at one end to said receptacle and extending between the flanges of the base-plate, said drop-slide having an opening therethrough, a spring secured at one end to the base-plate and at its opposite end to the free end of the drop-slide, a cut-off plate held yieldingly to the sloping floor of the seed-receptacle and projecting through the opening in said receptacle, and means for actuating the free end of the drop-slide to cause the opening therethrough to come into registry with the opening through the base-plate.

5. In a replanter attachment for cultivators, a drop slide or plate having an opening therethrough and an annular recess in the upper face of the slide surrounding said opening, a bushing having a horizontally-projecting annular flange at its upper end, said bushing adapted to be removably held in said opening, and a set-screw passing transversely through the drop-slide and fitted to engage the outer side wall of the bushing, whereby said bushing may be held securely in place, and also removed from the drop-slide

OSCAR FROMAN.
JOHN C. CAVE.

Witnesses:
J. H. GOODWIN,
J. H. SHARP.